(12) United States Patent
Hu et al.

(10) Patent No.: US 9,992,382 B2
(45) Date of Patent: Jun. 5, 2018

(54) COLOR TABLE COMPRESSION

(71) Applicants: HEWLETT-PACKARD DEVELOPMENT COMPANY, L.P., Houston, TX (US); PURDUE RESEARCH FOUNDATION, West Lafayette, IN (US)

(72) Inventors: Zhenhua Hu, West Lafayette, IN (US); Chuohao Tang, Fremont, CA (US); Terry M. Nelson, Boise, ID (US); Mark Q. Shaw, Meridian, ID (US); Jan P. Allebach, West Lafayette, IN (US); Amy Ruth Reibman, West Lafayette, IN (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days. days.

(21) Appl. No.: 15/642,929

(22) Filed: Jul. 6, 2017

(65) Prior Publication Data

US 2018/0013925 A1    Jan. 11, 2018

Related U.S. Application Data

(63) Continuation of application No. PCT/US2016/060873, filed on Nov. 7, 2016.

(30) Foreign Application Priority Data

Jul. 8, 2016    (WO) ................ PCT/US2016/041633

(51) Int. Cl.
*H04N 1/60*    (2006.01)
*H04N 1/41*    (2006.01)
*H04N 1/00*    (2006.01)

(52) U.S. Cl.
CPC ............... *H04N 1/603* (2013.01); *H04N 1/41* (2013.01); *H04N 1/6008* (2013.01);
(Continued)

(58) Field of Classification Search
USPC ........................................................ 358/1.9
See application file for complete search history.

(56) References Cited

U.S. PATENT DOCUMENTS 5,644,509 A    7/1997    Schwartz
5,748,176 A    5/1998    Gondek
(Continued)

FOREIGN PATENT DOCUMENTS

JP    2003110869 A    4/2003
WO    WO-2006081253    8/2006
(Continued)

OTHER PUBLICATIONS

European Patent Office, Communication pursuant to Article 94(3) EPC for App. No. 17179824.2 dated Dec. 20, 2017 (5 pages).
(Continued)

*Primary Examiner* — Helen Zong
(74) *Attorney, Agent, or Firm* — Trop, Pruner & Hu, P.C.

(57) ABSTRACT

In some examples, a print cartridge includes a memory device comprising quantized coefficients derived from a compression of a difference table including a plurality of difference nodes in which each difference node represents a value that is a difference of a value of a node of a color table and a value of a corresponding node of a reference table, the quantized coefficients useable to produce a reconstructed difference table, and a plurality of residue nodes in which each residue node represents a value that is a difference of a value of a node of the color table and a value of a corresponding node of the reconstructed difference table.

29 Claims, 5 Drawing Sheets

(52) U.S. Cl.
 CPC ......... *H04N 1/6019* (2013.01); *H04N 1/6058* (2013.01); *H04N 1/00538* (2013.01)

(56) References Cited

U.S. PATENT DOCUMENTS

| | | | |
|---|---|---|---|
| 5,751,434 | A | 5/1998 | Narendranath et al. |
| 5,930,553 | A | 7/1999 | Hirst et al. |
| 5,982,990 | A | 11/1999 | Gondek |
| 6,313,925 | B1 | 11/2001 | Decker et al. |
| 6,327,383 | B2 | 12/2001 | Todoroki |
| 6,804,025 | B1 | 10/2004 | Masashi et al. |
| 6,816,179 | B2 | 11/2004 | Hanyu |
| 7,221,473 | B2 | 5/2007 | Jeran |
| 7,259,890 | B2 | 8/2007 | Jeran |
| 7,633,658 | B2 | 12/2009 | Tsuji |
| 7,663,781 | B2 | 2/2010 | Song et al. |
| 7,796,296 | B2 | 9/2010 | Martinez et al. |
| 7,826,111 | B2 | 11/2010 | Won et al. |
| 8,203,758 | B2 | 6/2012 | Itagaki |
| 8,274,696 | B2 | 9/2012 | Yoneda |
| 8,526,062 | B2 | 9/2013 | Klassen |
| 8,740,343 | B2 | 6/2014 | Kawai |
| 8,797,616 | B2 | 8/2014 | Sugiura et al. |
| 8,885,216 | B2 | 11/2014 | Ishitoya et al. |
| 9,111,204 | B2 | 8/2015 | Fujita et al. |
| 9,621,764 | B2 | 4/2017 | Gondek |
| 2002/0126301 | A1 | 9/2002 | Bowers |
| 2002/0149785 | A1 | 10/2002 | Chu et al. |
| 2003/0025939 | A1 | 2/2003 | Jeran |
| 2005/0073731 | A1 | 4/2005 | Deer et al. |
| 2007/0081205 | A1 | 4/2007 | Tai et al. |
| 2007/0115506 | A1 | 5/2007 | Yada |
| 2007/0195342 | A1 | 8/2007 | Sugiura et al. |
| 2007/0291287 | A1 | 12/2007 | Snyder et al. |
| 2010/0085605 | A1 | 4/2010 | Shaw et al. |
| 2010/0157331 | A1 | 6/2010 | Shestak |
| 2010/0220926 | A1 | 9/2010 | Monga et al. |
| 2010/0296114 | A1 | 11/2010 | Jung et al. |
| 2014/0098387 | A1 | 4/2014 | Chang |
| 2015/0103902 | A1 | 4/2015 | Li et al. |
| 2016/0112606 | A1 | 4/2016 | Gondek et al. |

FOREIGN PATENT DOCUMENTS

| | | |
|---|---|---|
| WO | WO-2015016860 | 2/2015 |
| WO | WO-2015042432 | 3/2015 |
| WO | WO-2016028272 | 2/2016 |
| WO | WO-2016186625 | 11/2016 |

OTHER PUBLICATIONS

Arnavut, Z et al. Lossless Compression of Color Peletts Images with One-dimensional Techniques, Apr.-Jun. 2006. <http://scholarworks.rit.edu/ogl/viewcontent.ogi?article=2049&context=article>(13 pages).

Balaji et al., Hierarchical Compression of Color Look Up Tables, 15th Color imaging Conference Final Program and Proceedings, 2008 (6 pages).

Boon-Lock Yeo and Bede Liu, Volume rendering of DCT-based compressed 3D scalar data, IEEE Transactions on Visualization and Computer Graphics, 1(1):29-43, Mar. 1995 (15 pages).

Canon Imagepress Server Color Management Guide, 2009, <http://www.techsupport.ousa.canon.com/pf/MI-IPContent/Imagepress/iPress-Server-Color-Guide.pdf> (31 pages).

Chuohao Tang et al., U.S. Appl. No. 15/611,462 entitled Color Table Compression, filed Jun. 1, 2017 (33 pages).

De Queiroz et al., On Independent Color Space Transformations for the Compression of CMYK Images; IEEE Transactions on Image Processing, vol. 8, No. 10, Oct. 1999 (6 pages).

Deutsch, Network Working Group, Request for Comments: 1952, Category: Informational, GZIP file format specification version 4.3, May 1996 (19 pages).

European Patent Office, International Search Report and Written Opinion for PCT/US2016/041633 dated Mar. 20, 2017 (19 pages).

European Patent Office, International Search Report and Written Opinion for PCT/US2016/060873 dated Mar. 20, 2017 (16 pages).

European Patent Office, International Search Report and Written Opinion for PCT/US2016/060874 dated Mar. 14, 2017 (16 pages).

European Patent Office, International Search Report and Written Opinion for PCT/US2016/060675 dated Mar. 14, 2017 (18 pages).

European Patent Office, International Search Report and Written Opinion for PCT/US2016/060876 dated Mar. 9, 2017 (14 pages).

European Patent Office, International Search Report and Written Opinion for PCT/US2016/060877 dated Mar. 10, 2017 (17 pages).

Hewlett-Packard Development Company L.P., International Application No. PCT/US2016/060875 entitled Printing Device Supply Component filed Nov. 7, 2016 (42 pages).

Hewlett-Packard Development Company L.P., International Application No. PCT/US2016/060876 entitled Printing Device Supply Component filed Nov. 7, 2016 (38 pages).

Hewlett-Packard Development Company, L.P., International Appl. No. PCT/US2016/041633 entitled Color Table Compression filed Jul. 8, 2016 (29 pages).

ICC Profiles dated on or before Jun. 26, 2016 (2 pages).

International Color Consortium, Specification, ICC, 1:2010 (Profile version 4.3.0.0) Image technology colour management—Architecture, profile format, and data structure [Revision of ICC. 1:2004-10], 2010 (130 pages).

Kim, Low Bit-Rate, Scalable Video Coding with 3D Set Petitioning in Hierarchical Trees (3D SPIHT), date unknown (34 pages).

Lexmark.com—Color Quality Guide. Oct. 17, 2007, <http://publications.lexmark.com/publications/pdfs/2007/cx310/cx310_hmp/en/color-quality-guide.pdf > (5 pages).

Lou—Abstract Only—The development of the CIE 2000 colour-difference formula: CIEDE2000, Aug. 2001 (4 pages).

Luo et al., Uniform Colour Spaces Based on CIECAM02 Colour Appearance Model, 2006 (11 pages).

LZMA-SDK (Software Development Kit) dated on or before Jan. 7, 2009 (2 pages).

Mark Q. Shaw et al., U.S. Appl. No. 15/702,138 entitled Printing Device Supply Component, filed Sep. 12, 2017 (42 pages).

Monga, V. et al, "Design and Optimization of Color Lookup Tables on a Simplex Topology", Apr. 2012, pp. 1981-1996.

Robertson, Color Research & Application—Abstract Only, 1977 (4 pages).

Said, A New Fast and Efficient Image Codec Based on Set Partitioning in Hierarchical Trees, IEEE, May 1993 (16 pages).

Shapiro, Embeeded Image Coding Using Zerotrees of Wavelet Coefficients, IEEE, Dec. 1993 (18 pages).

Sudhakar, Image Compression using Coding of Wavelet Coefficients—A Survey, Jun. 2005 (14 pages).

Tang, ICC Profile Color Table Compression, Nov. 7, 2016 (6 pages).

Tang, Three-Dimensional Wavelet-Based Compression of Hyperspectral Images, 2006 (36 pages).

U.S. Appl, No. 15/611,462, Final Rejection dated Dec. 1, 2017, pp. 1-20 and attachments.

U.S. Appl. No. 15/611,462, Non-Final Rejection dated Jul. 28, 2017, pp. 1-13 and attachment.

Watson, Image Compression Using the Discrete Cosine Transform, 1994 (17 pages).

Balaji et al., Preprocessing Methods for Improved Lossless Compression of Color Look-up Tables, Journal of Imaging Science and Technology, 2008 (9 pages).

European Patent Office, Communication~European Search Report for Appl. No. 17180591.4 dated Nov. 27, 2017 (4 pages).

COLOR TABLE COMPRESSION

CROSS REFERENCE TO RELATED APPLICATIONS

This is a continuation of International Application No. PCT/US2016/060873, filed Nov. 7, 2016, which claims priority from International Application No. PCT/US2016/041633, filed Jul. 8, 2016, which are both hereby incorporated by reference in their entirety.

BACKGROUND

Color management systems deliver a controlled conversion between color representations of various devices, such as image scanner, digital camera, computer monitors, printers, and corresponding media. Device profiles provide color management systems with information to convert color data between color spaces such as between native device color spaces and device-independent color spaces, between device-independent color spaces and native device color spaces, and between source device color spaces and directly to target device color spaces.

DETAILED DESCRIPTION

Figure 1:
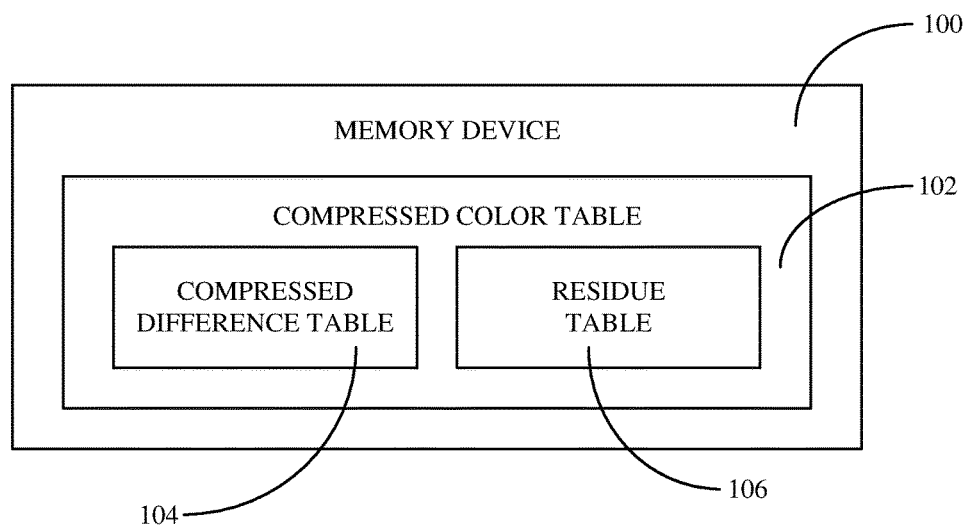
FIG. 1 is a block diagram illustrating an example memory device having a compressed color table.

In the following detailed description, reference is made to the accompanying drawings, which form a part hereof, and in which are shown by way of illustration as specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

A color space is a system having axes and that describes color numerically. Some output devices, such as two-dimensional and three-dimensional (additive manufacturing) printing devices, may employ a type of cyan-magenta-yellow-key (black) (CMYK) color space, while some software applications and display devices may employ a type of red-green-blue (RGB) color space. Additionally, some software devices may employ a monochromatic or gray scale color space. For example, a color represented in the CMYK color space has a cyan value, a magenta value, a yellow value, and a key value that combined numerically represent the color.

Color tables that provide transformations between various color spaces are extensively used in color management, common examples being the transformations from device independent color spaces (such as CIELAB, i.e., L*a*b*) to device dependent color spaces (such as RGB or CMYK) and vice versa. The mappings may be specified using tables such as one or more single or multidimensional lookup tables, to which interpolation can be applied, or through a series of parameters for transformations. A color table can include an array or other data structure on a memory device that replaces runtime computations with a simpler array indexing operation as a color lookup table. For the purposes of this disclosure, color tables can also include monochromatic and gray scale color tables.

For example, a color table can include a set of M nodes that may accommodate M colors from a range of total colors. Each node includes a particular color value represented as a set of bits or bytes. A color table of 256 colors in the RGB color space may be represented with 256 nodes with each node having a depth of 18 bits, i.e., six bits for each value of red, green, and blue.

A color profile is a data file that characterizes the transformation between different color spaces. In one example, a color profile can describe the color attributes of a particular device or viewing specifications with a mapping between the device-dependent color space, such as a source or target color space, and a device-independent color space, such as profile connection space (PCS), and vice versa. Devices and software programs—including printers, monitors, televisions, operating systems, browsers, and other device and software—that capture or display color can include profiles that comprise various combinations of hardware and programming.

An ICC profile is an example color profile that is a set of data that characterizes a color space according to standards promulgated by the International Color Consortium (ICC). The ICC profile framework has been used as a standard to communicate and interchange between various color spaces. An ICC profile includes a number of data records that can vary with the type of device. Some records, such as those including color lookup tables, provide data for use in color transformations. A color lookup table record includes multiple components that provide parameters for color transformations between device space and the PCS. The lookup tables can include color conversion matrices, one-dimensional lookup tables, and multidimensional lookup tables. The number of channels at the input and the output of the lookup table will vary depending on the color space involved.

ICC profiles are often embedded in color documents as various combinations of hardware and programming to achieve color fidelity between different devices, which increases the total size of these documents. Each graphical element, i.e. a figure or image in the color document may have its own ICC profile. The size of color tables in the color profiles will also increase with finer sampling of the spaces and larger bit depths. For devices such as color printers, the color tables are often embedded in the printer firmware or other hardware, where the color tables consume computer memory in storage devices.

In general, a profile can include N color tables to be processed, such as $CLUT_1, CLUT_2, \ldots, CLUT_N$. Multiple color tables representing different rendering intents are often be included with one ICC profile. Further, the input color space includes $J_{in}$ channels and the output color space includes $J_{out}$ channels, and in many examples of an ICC profile $J_{in}$ and $J_{out}$ can be one or more channels. For each output channel, the corresponding lookup table contains $M^{J_{in}}$ nodes.

In some scenarios, the amount of firmware memory consumed for storing these color tables can become a concern, particularly as the number of the look up tables in color devices increases to support multiple color spaces, print media, and preferences. The trend toward finer sampling of the spaces and larger bit depths also results in an increase in table sizes, further exacerbating these memory concerns. Additionally, the concerns of efficient memory use and storage space consumption are applicable for color tables that are embedded in color documents such as ICC source profiles. In applications in which embedded profiles are used, the embedded profiles represent an overhead.

FIG. 1 illustrates an example memory device 100 including a compressed color table 102. The compressed color table 102 may be a compressed original color table. The original color table includes a set of nodes. In one example, the memory device 100 can be included on a printer cartridge or printer. In another example, the memory device 100 is included in cooperating parts, such as one part on a printer cartridge and another part on the printer that can be processed together. The compressed color table 102 is provided on the memory device 100 as including a compressed difference table 104 and a residue table 106. The compressed color table 102 can be stored as a set of files, including binary files, or as bitstreams. The difference table 104 includes a plurality of difference nodes in which each node represents a difference between a value of a node of an original color table and a value of a node of a reference table. The reference table includes nodes having a preselected, or predetermined value. In one example, the values of the nodes of the reference table are representative of the nodes of the original color table. The residue table 106 includes a plurality of residue nodes in which each node represents a difference of between a value of a node of the original color table and a value of a node of a reconstructed compressed difference table.

The example memory device 100 can be implemented to include a combination of one or more volatile or nonvolatile computer storage media. Computer storage media may be implemented as any suitable method or technology for storage of information such as computer readable instructions, data structures, program modules or other data. A propagating signal by itself does not qualify as storage media or a memory device. The memory device can be included as part of a system including a processor and memory for storing a set of computer instruction for controlling the processor to perform a color transformation. Examples include a memory device included as part of a printer cartridge that can be read by a printer to perform color transformations based on such specifications such as ink or media parameters or device specifications.

Figure 2:
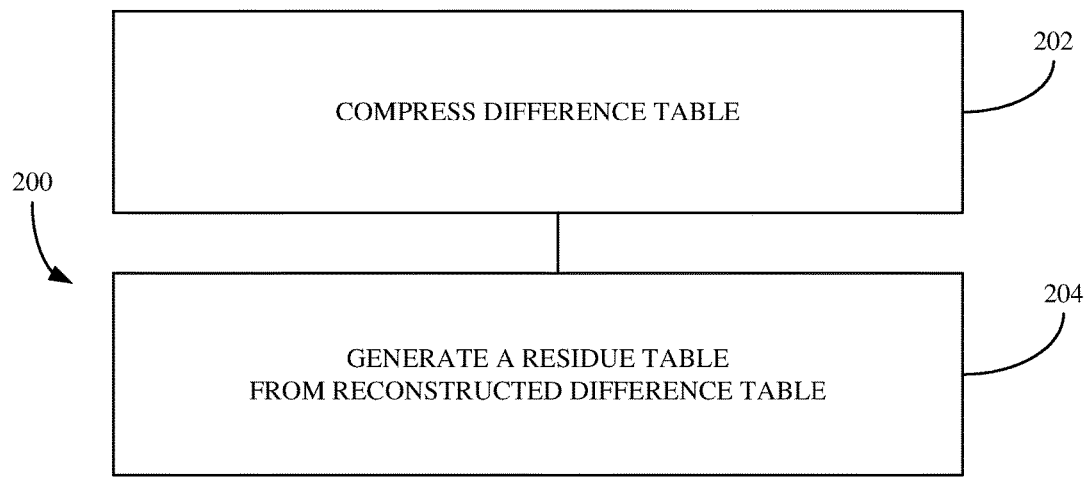
FIG. 2 is a block diagram illustrating an example method of compressing the color table for the memory device of FIG. 1.

FIG. 2 illustrates an example method 200 that can be employed to compress a color table, or original color table. The examples are described with reference to one-dimensional color tables, i.e., color tables having one input channel, one output channel, and thus M nodes, although the concepts can be transferrable to multi-dimensional color tables and other color profile records. A difference table is compressed at 202. The difference table includes a plurality of difference nodes representing a difference of values of nodes of the color table and nodes of a reference table. The compressed difference table is reconstructed and applied to generate a residue table at 204. The residue table includes a plurality of residue nodes representing a difference of values of the nodes of the color table and nodes of a reconstructed compressed difference table. The compressed difference table and residue table can be stored as data files on a memory device, such as device 100.

In one example, the difference color table is compressed at 202 using a discrete cosine transform, or DCT, which expresses a finite sequence of data points in terms of a sum of cosine functions oscillating at different frequencies, although other systems can be employed. DCT compression can be particularly apt for examples in which color tables may be expressed in single or multiple dimensions. In other examples, the difference color table could be compressed using a system that could be based on wavelets, such as the SPIHT (Set Partitioning In Hierarchical Trees) and SPECK (Set Partitioned Embedded bloCK).

The example method 200 can be implemented to include a combination of one or more hardware devices and programs for controlling a system, such as a computing device having a processor and memory, to perform method 200 to compress a color table into a file or a bitstream. The file or bitstream may be subdivided into additional files or bitstreams. Method 200 can be implemented as a set of executable instructions for controlling the processor. Other methods of the disclosure can be implemented as a combination of hardware and programming for controlling a system as well.

Data compression includes encoding information using fewer bits than the original representation. Lossless compression and lossy compression are two forms of data compression. In lossless compression, no digital difference exists between the original data and the reconstructed lossy compressed data. In contrast, a portion of the original data is lost upon reconstruction of lossy compressed data.

In the example method of 200, a specific lossless compression system can be employed to exploit particular characteristics of the original color table to be compressed. The specific lossless compression can be applied to the original color table into files that can be reconstructed into a color table with no digital difference from the original color table. A general lossless compression system can be employed to compress any kind of data. One or more of these files can be further compressed with a general lossless compression system to further reduce the size of the files.

Figure 3:
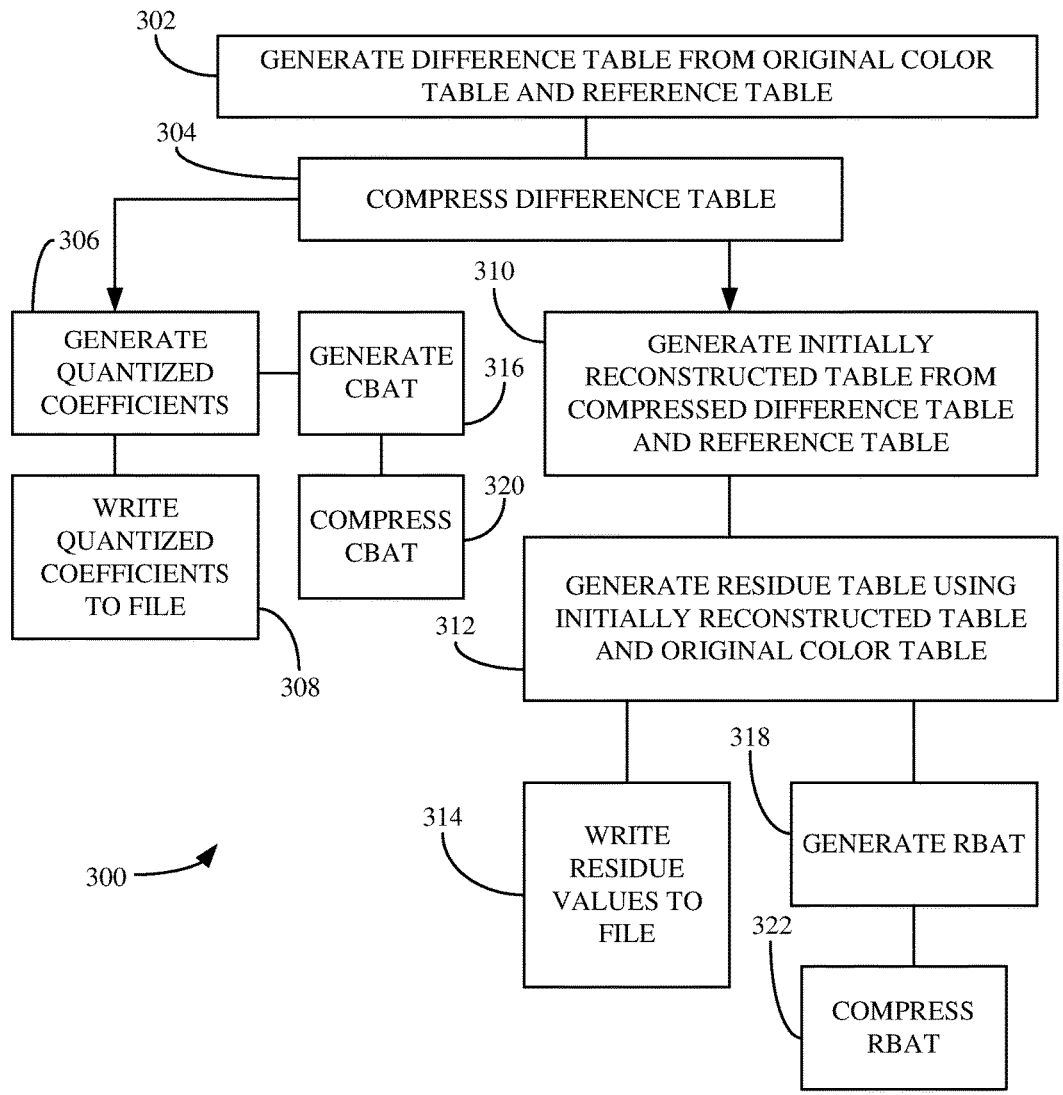
FIG. 3 is a block diagram illustrating an example method having additional features of the example method of FIG. 2.

FIG. 3 illustrates an example method 300 of compressing an original color table as in method 200. The example method 300 can be implemented in stages including a specific lossless compression stage that exploits specific characteristics of the color table data and a general lossless compression stage for high data compression. In one example, the stages of the method are performed consecutively.

Process 300 generates a difference table from the original color table and a reference table at 302. The difference table includes a plurality of difference nodes in which each node includes a value that represents a difference of a value of a node of the original color table and a value of a node of a reference table. In one example, the original color table and reference table each include M nodes. The value of each node of the original color table is subtracted from the value of the corresponding node in the reference table to provide a value at the corresponding node in the difference table. Thus, the value at node location j of the original color table is subtracted from the value at node location j of the reference table to provide the value at node location j of the difference color table, in which j is the node location from 1 to M.

The reference table includes nodes having a preselected, or predetermined value that may be representative of the nodes of the original color table. In one example, the smaller the values for the difference nodes, the smaller the values of the nodes in the residue table, which can provide for efficient compression. In one example, values for reference nodes can be $\{0, 1, 2 \ldots (M-1)\}$ for the reference table.

The difference table is compressed at 304. In the example, the difference table is compressed via the DCT to generate a set of coefficients that can be further processed to generate a set of quantized coefficients at 306. A difference table having M nodes will generate M coefficients. Each of the coefficients in the set of coefficients can be divided by, or quantized, with a fixed step size $\Delta$ and rounded to the nearest integer to provide the set of M quantized coefficients at 306. The quantized coefficients can be written to a binary file at 308.

The compressed difference table is reconstructed and applied to the reference table to generate an initially reconstructed table at 310. For example, the quantized coefficients from 306 are used to generate a reconstructed difference table. In the example, the quantized coefficients multiplied by the step size $\Delta$ are applied in an inverse DCT process and rounded to the nearest integer to obtain the values at the nodes of the reconstructed difference table. The reconstructed difference table is added to the reference table to obtain the initially reconstructed table at 310. In one example, the reconstructed difference table and reference table each include M nodes, and the value of each node of the reconstructed difference table is added to the value at the corresponding node in the reference table to provide a value at the corresponding node in the initially reconstructed table.

The initially reconstructed table is subtracted from the original color table to obtain a residue table at 312. In one example, the initially reconstructed table and original table each include M nodes, and the value of each node of the initially reconstructed table is subtracted from the value of the corresponding node in the original table to provide a value at the corresponding node in the residue table. The residue table can be written to a binary file at 314. In one example, the residue table added to the initially reconstructed table creates a color table that has no or generally no digital difference from the original color table. In another example the residue table is determined to that it added to the initially reconstructed table creates an approximation of the original color table.

The quantized coefficients and residue table are used to calculate corresponding bit assignment tables. The quantized coefficients are used to calculate a coefficient bit assignment table (CBAT) at 316 that can be used to decode the quantized coefficients written to the binary file at 308. Similarly, the values of the residue table can be used to calculate a residue bit assignment table (RBAT) at 318 that can be used to decode the residue table written to the binary file at 314. A single dimensional original color table will include one CBAT and one RBAT.

The CBAT and RBAT generated at 316, 318 store the information related to how many bits are assigned to each quantized coefficient or residue value, respectively. For example, $\lceil \log_2 L \rceil$ bits are used to quantize a real number in the range −0.5 to L−0.5 to an integer value, in which $\lceil \log_2(L) \rceil$ represents a ceiling function of the base-2 logarithm of L, $\log_2(L)$, and a ceiling function maps the real number to the smallest subsequent integer. An additional bit is provided for the sign in the CBAT and RBAT because coefficients and residue values can be a negative number.

An example process can be applied to calculate a bit assignment table for each of the CBAT and RBAT at 316, 318. For a given output channel, the quantized DCT coefficient of the output channel is denoted as $Q_{ij}$, in which i (from 1 to N) is the color table number and j (from 1 to M) is the node number for a single dimensional original color table (and from 1 to $M^{J_{in}}$ for a multidimensional color table). The number of bits $B_{ij}$ needed for $Q_{ij}$ is $B_{i,j}=0$ if $Q_{ij}$ is 0 and $B_{i,j}=\lceil \log_2|Q_{i,j}|\rceil$ if $Q_{ij}$ is not 0.

In one example, a fixed number of bits a can be assigned to every node of the respective bit assignment tables and used to determine the size of each bit assignment table. The value of the bit assignment tables at node location j, or $L_j$, can be determined from the largest number of bits $B_{i,j}$ needed for each color table i (from 1 to N). The fixed number of bits a can be determined from the largest number of $\lceil \log_2(L_j) \rceil$ as determined for each node location j (from 1 to M). In the example, the total size of one bit assignment table for a single dimensional color table is thus aM bits.

The total size of the CBAT and RBAT can be significantly reduced via a general lossless compression. General lossless compression can be implemented using a variety of compression systems including Lempel-Ziv-Markov chain Algorithm process (or LZMA), GZIP (or GNU-zip) process, or other suitable lossless compression systems that can be applied to obtain lossless compression of data files. The CBAT can be compressed at 320 and the RBAT can be compressed at 322 with the lossless compression such as LZMA.

In some examples, the quantized coefficients and residue binary files can be compressed with the general lossless compression, but LZMA may not have as good of compression performance for the quantized coefficients and residue table as for the bit assignment tables, which can include high redundancy.

The selected step size $\Delta$ used to generate the quantized coefficients at 306 can affect an amount of compression. A compression ratio can be determined from the size of the original color table divided by the size of the all the files, i.e., the size of the quantized coefficients, residue table, and the bit assignment tables. A larger step size $\Delta$ achieves smaller quantized DCT coefficients but larger residue values, but a smaller step size $\Delta$ achieves larger quantized DCT coefficients but smaller residue values. An optimized compression ratio balances the size of the quantized coefficient file and the size of the residue table file. In calculating the compression ratio as a function of step size $\Delta$, it has been determined that the compression ratio first increases, reaches a peak at an optimized step size $\Delta_{opt}$, and decreases as step size $\Delta$ is increased. In one example, a generally high compression ratio can be achieved at a step size $\Delta$ selected of approximately 2.

DCT compression also can be particularly apt for examples in which color tables may be expressed in multiple dimensions. In further processing a multidimensional color table at 306, the $J_{in}$-dimensional quantized coefficients can be reordered into a one-dimensional data stream of a selected order. The selected order can be based upon a multidimensional zigzag ordering, such as a three-dimensional zigzag ordering, which can be used to reorder the quantized coefficients because the energy after the DCT transform is concentrated in the low frequency domain. In performing a three-dimensional ordering, traversals can be configured such that the planes i+j+k=c are visited in increasing order of c and a two-dimensional zigzagging is performed within each plane. Such traversals of the quantized coefficients from low-to-high frequency can introduce a large amount of redundancy to the coefficient bit assignment table, which can provide efficient packing of the data in compression. The resulting one-dimensional data stream of quantized coefficients from a multidimensional color table can be written to a binary file at 308.

In the case of a multidimensional table, each output channel can correspond to a separate coefficient bit assignment table. Accordingly, a profile having $J_{out}$ output channels will include $J_{out}$ coefficient bit assignment tables. The nodes in each bit assignment table correspond with the nodes of the original color table.

Figure 4:
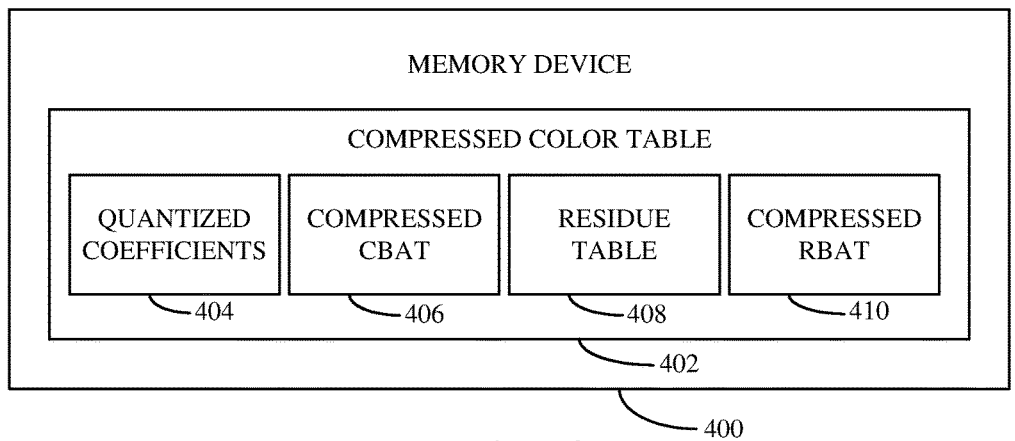
FIG. 4 is a block diagram illustrating another example memory device having compressed color table.

FIG. 4 illustrates an example memory device 400 including the compressed color table 402, which can correspond with compressed color table 102 of FIG. 1. The compressed color table 402 stored on the memory device 400 includes bitstreams of quantized coefficients 404, a compressed coefficient bit assignment table (CBAT) 406, a residue table 408, and a compressed residue bit assignment table (RBAT) 410. For example, a bitstream of the quantized coefficients 404 can be determined from method 300 at 308, a bitstream of the compressed CBAT 406 determined at 320, a bitstream of the residue table 408 determined at 312, and a bitstream of the compressed RBAT 410 determined at 322, which are stored on the memory device 400. In one example, the CBAT and RBAT are compressed with an LZMA process and compressed CBAT 406 and compressed RBAT 410 are stored as .lzma files on memory device 400. In one example, the quantized coefficients 404 and residue table 408 are stored as a binary file (.bin) on memory device 400. (In another example, the quantized coefficients and residue tables generated at 308, 312 are compressed with a general compression technique such as LZMA and files 404 and 408 are stored on memory device 400 as .lmza files.) Memory device 400 can be an example of memory device 100.

Figure 5:
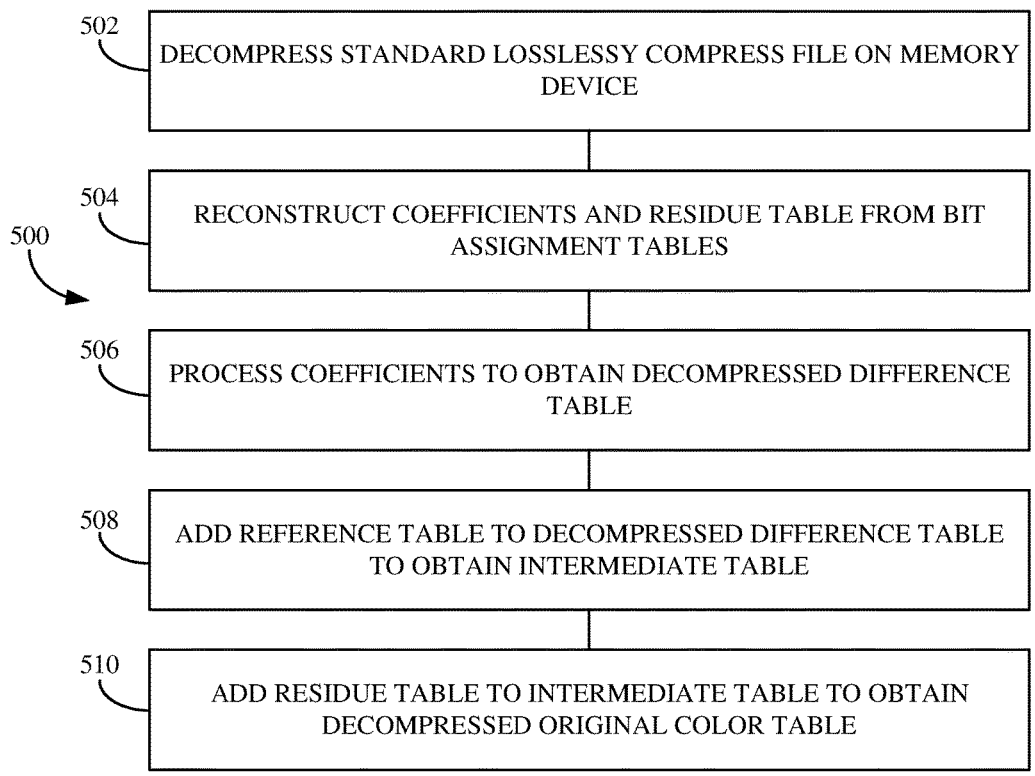
FIG. 5 is a block diagram illustrating an example method of decoding a compressed color table.

FIG. 5 illustrates an example method 500 of decoding the compressed original color table 402, such as the files 404-410 on memory device 400.

If one or more files 402, 404, 406, or 408 are compressed with a general lossless compression, the standard losslessly compressed files 402, 404, 406, or 408 on memory device 400 are decompressed at 502. For example, a standard lossless decompression technique, such as inverse LZMA or inverse GZIP (i.e., the inverse of the general lossless compression applied at 320, 322 and to other files) is applied to the compressed CBAT and RBAT files 406, 410 to yield the decompressed bit assignment tables, or CBAT and RBAT, at 502.

The decompressed CBAT is used to reconstruct the quantized coefficients, and the decompressed RBAT is used to reconstruct the residue table at 504. For example, the decompressed CBAT is applied to the quantized coefficient file 404 to determine how many bits of the binary stream are assigned to each quantized coefficient value of the M coefficients. Similarly, the decompressed RBAT is applied to the residue table file 408 to determine how many bits of the binary stream are assigned to each node of the residue table.

The set of M reconstructed quantized coefficients from 504 are processed to obtain the difference table at 506. The reconstructed coefficients are multiplied by the quantized step size $\Delta$ to obtain preprocessed coefficients. If a DCT was used to determine the coefficients at 304, an inverse DCT process is applied to the preprocessed coefficients and rounded to the nearest integer to obtain M nodes in a decompressed difference table at 506.

The reference table used at 302 is added to the decompressed difference table from 506 to obtain an intermediate table at 508. In one example, the decompressed difference table and reference table each include M nodes, and the value of each node of the decompressed difference table is added to the value of the corresponding node in the reference table to provide a value at the corresponding node in the intermediate table. Thus, the value at node location j of the decompressed difference table is added to the value at node location j of the reference table to provide the value at node location j of the intermediate table, in which j is the node location from 1 to M.

The intermediate table from 508 is added to the reconstructed residue table from 504 to obtain a decompressed original color table at 510. In one example, the intermediate table and reconstructed residue table each include M nodes, and the value of each node of the intermediate table is added to the value of the corresponding node in the reconstructed residue table to provide a value at the corresponding node in the decompressed original color table. Thus, the value at node location j of the intermediate table is added to the value at node location j of the reconstructed residue table to provide the value at node location j of the decompressed original color table, in which j is the node location from 1 to M. The decompressed original color table is the same as the original color table compressed with method 300.

The methods of compressing a single dimensional color table, such as method 300, were applied to 1DX1_75percent_nonlinear_mono.cxf and 1DX1_90percent_nonlinear_mono.cxf tables using a 1DX1_unity.cxf as a reference table. The reference table includes 256 nodes, which includes node increasing linearly from 0 to 255. The reference table can be stored on memory device 100, but also can be readily calculated and is not stored as part of the files of the compressed original color table. In this example, the M=256 and the bytedepth (the number of bytes used to store the value in each node) is b=2. In total, there are bM=256 bytes in each table and a total of 512 bytes in both tables. An integer step size $\Delta$ of 2 was selected to relatively optimize the balance of the size of the residue values and the size of the coefficients.

The residue table, quantized coefficients, RBAT, and CBAT were written as .bin binary files and compressed with a general lossless LZMA compression to become .lzma files. The residue table and quantized coefficients were not further compressed with a general lossless compression because the .lzma files were determined to be larger in size than the corresponding .bin files. Accordingly, the residue table and the quantized coefficients were stored as binary files while the RBAT and CBAT were stored as .lzma files.

Table 1 shows the size of the files in bytes when the residue table and quantized coefficients were stored as binary files and the RBAT and CBAT were stored as .lzma files. The two compressed original color tables occupied only 168 bytes, as compared to 512 bytes for the original tables, for a compression ratio of 3.05.

TABLE 1

| Compressed File | Size in Bytes |
| --- | --- |
| Residue Table | 35 |
| RBAT | 76 |
| Quantized DCT Coefficients | 23 |
| CBAT | 34 |
| Total Size | 168 |

Figure 6:
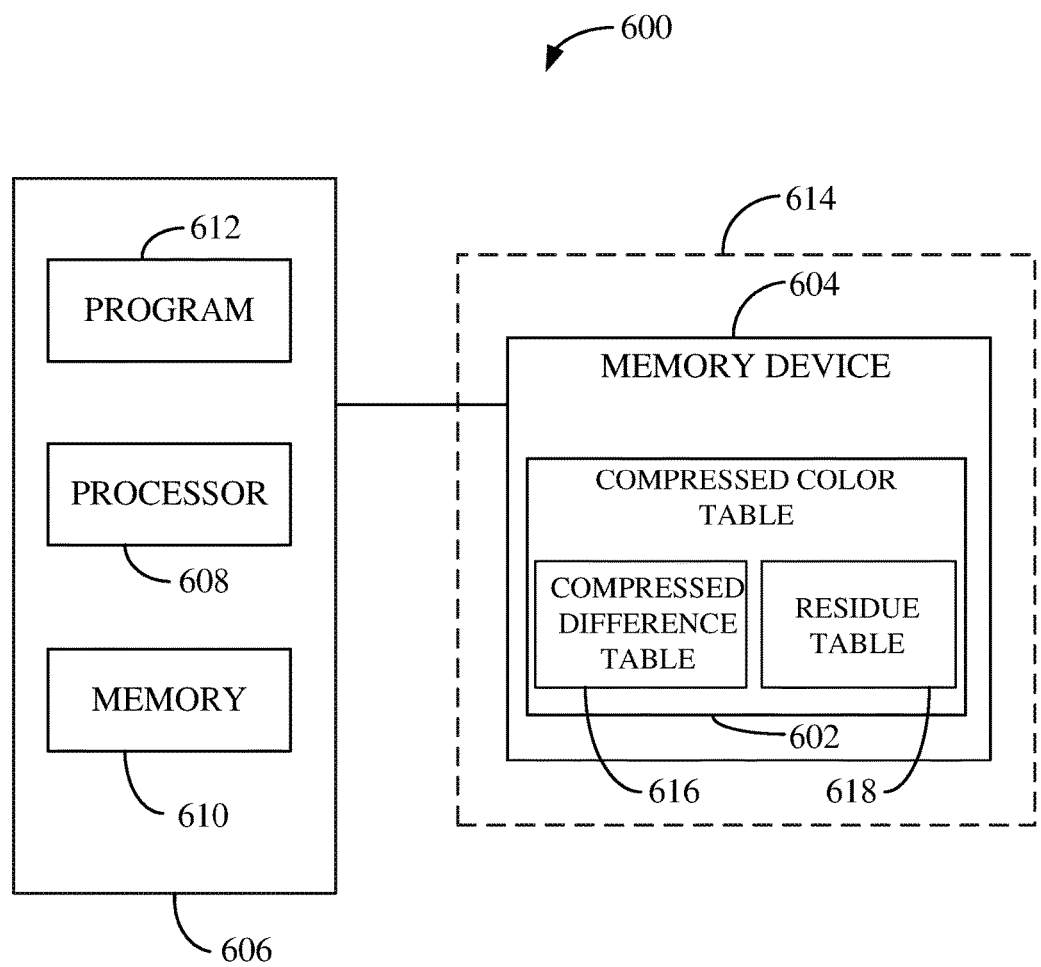
FIG. 6 is a block diagram illustrating an example system incorporating examples of the methods of FIGS. 2, 3 and 4 and the memory devices of FIGS. 1 and 4.

FIG. 6 illustrates an example system 600 that can be used to create a compressed color table 602 on a memory device 604. The compressed color table 602 can include a compressed difference table 616 and residue table 618. In one example, memory device 604 can correspond with one of the example memory devices 100, 400. For example, the compressed color table 602 can include the bitstreams of quantized coefficients 404, a compressed coefficient bit assignment table (CBAT) 406, a residue table 408, and a compressed residue bit assignment table (RBAT) 410 of compressed color table 402. Example system 600 includes a computing device 606 having a processor 608 and memory 610 that are configured to implement an example method of this disclosure, such as one or more of methods 200, 300 as a set of computer readable instructions stored in memory 610 for controlling the processor 608 to perform the method. In one example, the set of computer readable instructions can be implemented as a computer program 612 that can include various combinations of hardware and programming configured to operate on computing device 606. Computer program 612 can be stored in memory 610 and executed by the processor 608 to create the compressed color table 602 on memory device 604. The memory device 604 can be included in a consumable product 614 such as a printer cartridge.

Figure 7:
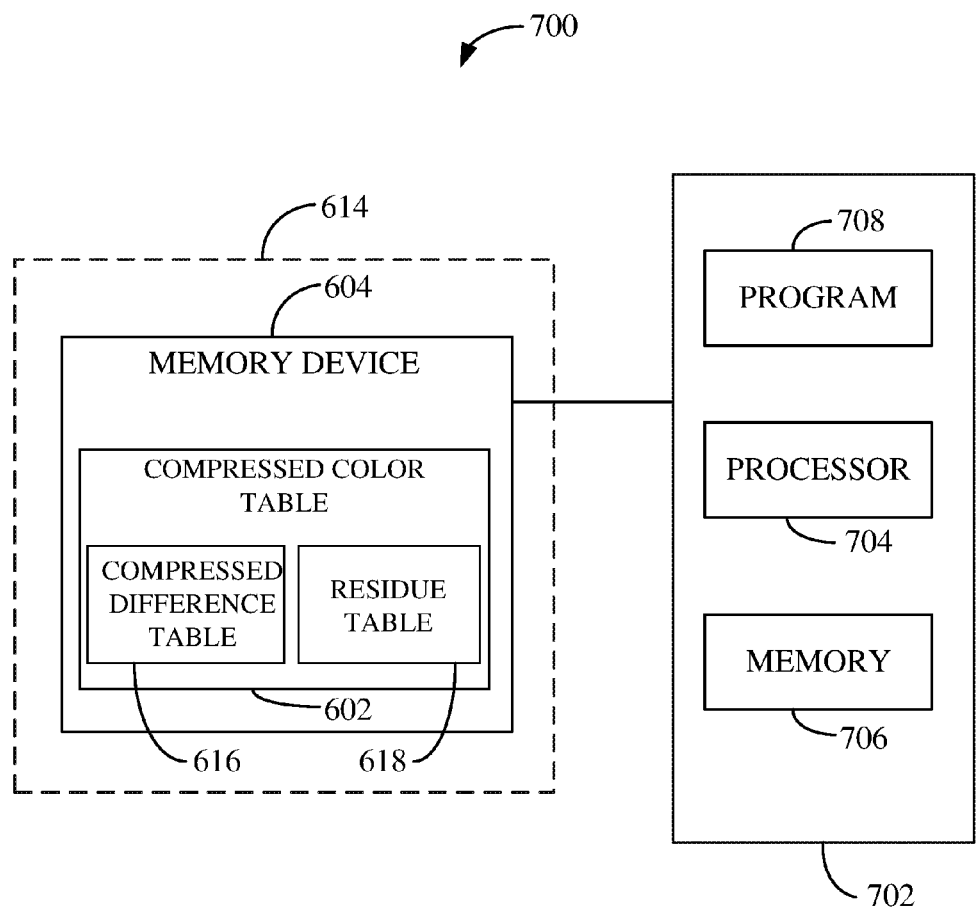
FIG. 7 is a block diagram illustrating an example system incorporating examples of the methods of FIG. 5 and memory devices of FIGS. 1 and 2.

FIG. 7 illustrates an example system 700 that can be used to apply the compressed color table 602 created on memory device 604 with a system, such as system 600. In the example, the memory device 604 is included in the consumable product 614 such as a printer cartridge having a reservoir of liquid ink, dry toner powder, or other printing or marking substance for use with a printer. In one example, the printer cartridge includes a color table corresponding with the printing or marking substance, such as a color table corresponding to black, cyan, magenta, or yellow ink.

The memory device 604 can be operably coupled to another computing device 702 having a processor 704 and memory 706 to read and apply the compressed color table 602. In one example, computing device 702 includes inherent printing capability and may be configured as a laser printer or ink-jet printer that can accept the memory device 604 and decompress and read the compressed color table 602 as a color look up table. The computing device 702 can include a set of computer readable instructions stored in memory 706 and executable by processor 704 to perform a method, such as the method 500 to decompress the color table 602 or otherwise apply the color table 602. In one example, the set of computer readable instructions can be implemented as a computer program 708 that can include various combinations of hardware and programming configured to operate on computing device 702. Computer program 708 can be stored in memory 706 and executed by the processor 704 to decompress the compressed color table 602 on memory device 604. In one example, the memory 706 can store the reference table used method 500. In another example, the reference table can be included as part of computer program 708 such as a data in data structure or as created with computer program via calculations performed with processor 704 and stored in memory 706.

In one example, the computing device 702 is coupled to a computer network such as the internet, and the compressed color table 602 is stored on a memory device 604 coupled to the computing device 702 via the network. The consumable product may include a code that, when activated with the computing device 702, the computing device downloads the compressed color table 602 (and also possibly the reference table) from the memory device to the memory 706 to read and apply the compressed color table 602 with the processor 704.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A print cartridge comprising:
a memory device comprising:
quantized coefficients derived from a compression of a difference table including a plurality of difference nodes in which each difference node represents a value that is a difference of a value of a node of a color table and a value of a corresponding node of a reference table, the quantized coefficients useable to produce a reconstructed difference table; and
a plurality of residue nodes in which each residue node represents a value that is a difference of a value of a node of the color table and a value of a corresponding node of the reconstructed difference table,
wherein the quantized coefficients and the plurality of residue nodes are accessible by a printing device to reconstruct a color table and perform a color transformation between color spaces when printing.

2. The print cartridge of claim 1, wherein the memory device comprises a residue table that includes the plurality of residue nodes.

3. The print cartridge of claim 2, wherein the memory device comprises a residue bit assignment table useable to decode the residue table.

4. The print cartridge of claim 3, wherein the residue bit assignment table indicates how many bits are assigned to each residue node of the plurality of residue nodes.

5. The print cartridge of claim 1, wherein the quantized coefficients are based on coefficients derived from application of a discrete cosine transform on the difference table.

6. The print cartridge of claim 1, wherein the quantized coefficients comprise a data stream of quantized coefficients.

7. The print cartridge of claim 6, wherein the data stream of quantized coefficients is a one-dimensional data stream of quantized coefficients.

8. The print cartridge of claim 1, wherein the memory device comprises a compressed version of the quantized coefficients and the plurality of residue nodes, the compressed version derived from lossless compression of the quantized coefficients and the plurality of residue nodes.

9. The print cartridge of claim 8, wherein the quantized coefficients are useable to produce the reconstructed difference table based on inverting the compression.

10. The print cartridge of claim 1, wherein the memory device further comprises a coefficient bit assignment table that includes information related to a number of bits assigned to each of the quantized coefficients.

11. The print cartridge of claim 1, wherein the memory device comprises a bitstream of the quantized coefficients, a bitstream of a coefficient bit assignment table, a bitstream of the plurality of residue nodes, and a bitstream of a residue bit assignment table.

12. The print cartridge of claim 11, wherein the bitstreams of the coefficient bit assignment table and the residue bit assignment table are compressed with a lossless compression.

13. The print cartridge of claim 1, further comprising a print material reservoir storing a print material.

14. The print cartridge of claim 1, further comprising a reservoir storing black ink or toner.

15. The print cartridge of claim 1, wherein the quantized coefficients are derived from a lossy compression of the difference table.

16. A print cartridge, comprising:
a memory device comprising:
quantized coefficients derived from a compression of a difference table including a plurality of difference nodes in which each difference node represents a value that is a difference of a value of a node of a color table and a value of a corresponding node of a reference table, the quantized coefficients useable to produce a reconstructed difference table; and
a residue table including a plurality of residue nodes in which each residue node represents a value that is a difference of a value of a node of the color table and a value of a corresponding node of the reconstructed difference table,
wherein the quantized coefficients and the plurality of residue nodes are accessible by a printing device to reconstruct a color table and perform a color transformation between color spaces when printing.

17. The print cartridge of claim 16, wherein the memory device further comprises a coefficient bit assignment table useable to decode the quantized coefficients, the coefficient bit assignment table including information related to a number of bits assigned to each of the quantized coefficients.

18. The print cartridge of claim 16, wherein the memory device further comprises a residue bit assignment table useable to decode the residue table, the residue bit assignment table indicating how many bits are assigned to each residue node of the residue table.

19. The print cartridge of claim 16, further comprising a reservoir of black toner or ink, and wherein the color table is a monochromatic color table.

20. The print cartridge of claim 16, wherein the quantized coefficients are useable with the reference table on a printing device to provide the reconstructed difference table.

21. A print cartridge comprising:
a memory device comprising a compressed data structure to construct a one-dimensional color transformation table for a printer, the data structure comprising:
quantized coefficients derived from a compression of a difference table including a plurality of difference nodes in which each difference node represents a value that is to be combined with a corresponding node of a reference table, the quantized coefficients useable to produce a reconstructed difference table;
a residue table including a plurality of residue nodes in which each residue node is to be combined with a corresponding node of the combination of the reconstructed difference table and the reference table; and
a residue bit assignment table useable to decode the residue table, the residue bit assignment table indicating how many bits are assigned to each residue node of the residue table,
wherein the quantized coefficients and the plurality of residue nodes are accessible by the printer to reconstruct a color table and perform a color transformation between color spaces when printing.

22. The print cartridge of claim 21, wherein the compressed data structure is a losslessly compressed data structure.

23. The print cartridge of claim 22, wherein the lossless compression is a Lempel-Ziv-Markov chain Algorithm compression.

24. The print cartridge of claim 21, wherein the quantized coefficients are derived from a lossy compression of the difference table.

25. The print cartridge of claim 21, wherein the quantized coefficients are quantized with a fixed step size using the lossy compression.

26. The print cartridge of claim 21, wherein the quantized coefficients are to be reconstructed using a cosine bit assignment table stored on the printer or cartridge, and multiplied by a fixed step size to obtain the decompressed difference table.

27. The print cartridge of claim 21, wherein the compressed data structure further comprises a coefficient bit assignment table derived from the quantized coefficients, the coefficient bit assignment table useable to decode the quantized coefficients, the coefficient bit assignment table including information related to a number of bits assigned to each of the quantized coefficients.

28. The print cartridge of claim 21, wherein the residue bit assignment table is derived from the residue table.

29. The print cartridge of claim 21, comprising black print material.

* * * * *

UNITED STATES PATENT AND TRADEMARK OFFICE
CERTIFICATE OF CORRECTION

PATENT NO.         : 9,992,382 B2
APPLICATION NO.    : 15/642929
DATED              : June 5, 2018
INVENTOR(S)        : Zhenhua Hu et al.

Page 1 of 1

It is certified that error appears in the above-identified patent and that said Letters Patent is hereby corrected as shown below:

In the Drawings

In sheet 3 of 5, Fig. 5, reference numeral 502, Line 1, delete "LOSSLESSY" and insert -- LOSSLESSLY --, therefor.

Signed and Sealed this
Eleventh Day of December, 2018

Andrei Iancu
*Director of the United States Patent and Trademark Office*